United States Patent [19]

Holland

[11] Patent Number: 5,302,228

[45] Date of Patent: Apr. 12, 1994

[54] APPARATUS AND METHOD FOR MAKING V-GROOVE INSULATION AND TANK WRAP

[76] Inventor: David Holland, 518 Sunpark, Friendswood, Tex. 77546

[21] Appl. No.: 884,798

[22] Filed: May 19, 1992

Related U.S. Application Data

[62] Division of Ser. No. 684,016, Apr. 11, 1991, Pat. No. 5,134,917.

[51] Int. Cl.⁵ .......................................... B32B 31/00
[52] U.S. Cl. .................................... 156/510; 156/556; 156/512; 156/516; 156/522; 156/519; 156/521; 83/487; 83/877; 83/614; 83/496; 83/341; 83/492
[58] Field of Search ............... 83/487, 877, 496, 997, 83/341, 492, 493, 614; 156/556, 510, 512, 516, 519, 521, 522

[56] References Cited

U.S. PATENT DOCUMENTS

| | | |
|---|---|---|
| 176,892 | 5/1876 | Rollins . |
| 698,006 | 4/1902 | Gerrish . |
| 1,940,106 | 12/1933 | Synder . |
| 2,335,767 | 11/1943 | Kinports . |
| 2,344,003 | 3/1944 | Sheptinsky . |
| 2,455,097 | 11/1948 | Scianna . |
| 2,735,426 | 2/1956 | Claydon . |
| 2,747,280 | 5/1956 | Kurata . |
| 2,800,163 | 7/1957 | Rusch ........................ 156/516 |
| 3,072,004 | 1/1963 | Jenkins . |
| 3,534,646 | 10/1970 | Tyer, Jr. . |
| 3,595,287 | 7/1971 | Indermark . |
| 3,610,079 | 10/1971 | Ashby . |
| 3,672,415 | 6/1972 | Holan . |
| 3,690,356 | 9/1972 | Holan . |
| 3,706,251 | 12/1972 | Wheeler et al. . |
| 3,730,031 | 5/1973 | Huttemann . |
| 3,820,233 | 6/1974 | Baker . |
| 3,821,915 | 7/1974 | Larrable . |
| 3,839,114 | 10/1974 | Schmidt et al. ............... 156/435 |
| 3,848,646 | 11/1974 | Miles . |
| 3,879,246 | 4/1975 | Walker ......................... 156/519 |
| 3,910,170 | 10/1975 | Boy . |
| 3,915,038 | 10/1975 | Malin . |
| 3,969,868 | 7/1976 | Bainter et al. . |
| 3,986,419 | 10/1976 | Cleghorn . |
| 4,054,165 | 10/1977 | Karakawa . |
| 4,139,669 | 2/1979 | Chang . |
| 4,208,934 | 6/1980 | Wall . |
| 4,224,854 | 9/1980 | Mallacheski et al. . |
| 4,227,960 | 10/1980 | Loeffler et al. ................. 156/519 |

(List continued on next page.)

FOREIGN PATENT DOCUMENTS 1905315 2/1969 Fed. Rep. of Germany .

Primary Examiner—Patrick J. Ryan
Assistant Examiner—Merrick Dixon
Attorney, Agent, or Firm—J. M. (Mark) Gilbreth

[57] ABSTRACT

Disclosed is an apparatus and method of fabricating tank wrap of desired thickness having fibers oriented generally in the thickness direction from lengths of insulation material having fibers oriented generally in the length direction. The method comprises several sequential steps. The first step is positioning the lengths of insulation material lengthwise along a first movable track conveyor, such that the fibers are oriented generally parallel to the direction of conveyance as the lengths progress downstream in a longitudinal direction along the conveyor. Second step is severing the insulation material completely across the length, at intervals equal to the desired thickness of the tank wrap to be fabricated. Next the cut lengths of insulation material are positioned lengthwise across a second movable track conveyor such that the fibers are now oriented generally perpendicular to the direction of conveyance, and in an abutting relationship. Finally, a continuous length of backing material is affixed to the abutted severed lengths to form a continuous length of tank wrap having fibers generally oriented in the thickness direction.

7 Claims, 3 Drawing Sheets

U.S. PATENT DOCUMENTS

| | | | |
|---|---|---|---|
| 4,233,100 | 11/1980 | Cunningham et al. | 156/512 |
| 4,234,657 | 11/1980 | Bussey, Jr. | |
| 4,409,875 | 10/1983 | Nakajima et al. | |
| 4,411,183 | 10/1983 | Auer | |
| 4,531,992 | 7/1985 | Eaton | 156/519 |
| 4,599,925 | 7/1986 | Rom | |
| 4,606,715 | 7/1986 | Larson | 156/556 |
| 4,608,902 | 9/1986 | Ivey | |
| 4,676,133 | 6/1987 | Fujimura | |
| 4,752,352 | 6/1985 | Feygin | 156/512 |
| 4,838,968 | 6/1989 | Nelson | |
| 4,864,906 | 9/1989 | Hall | |
| 4,951,539 | 8/1990 | Buckner | |
| 4,954,202 | 9/1990 | Price et al. | |
| 4,981,059 | 1/1991 | Kobayashi | |
| 5,001,955 | 3/1991 | Fujiwara | |
| 5,030,312 | 7/1991 | Williams et al. | 156/517 |

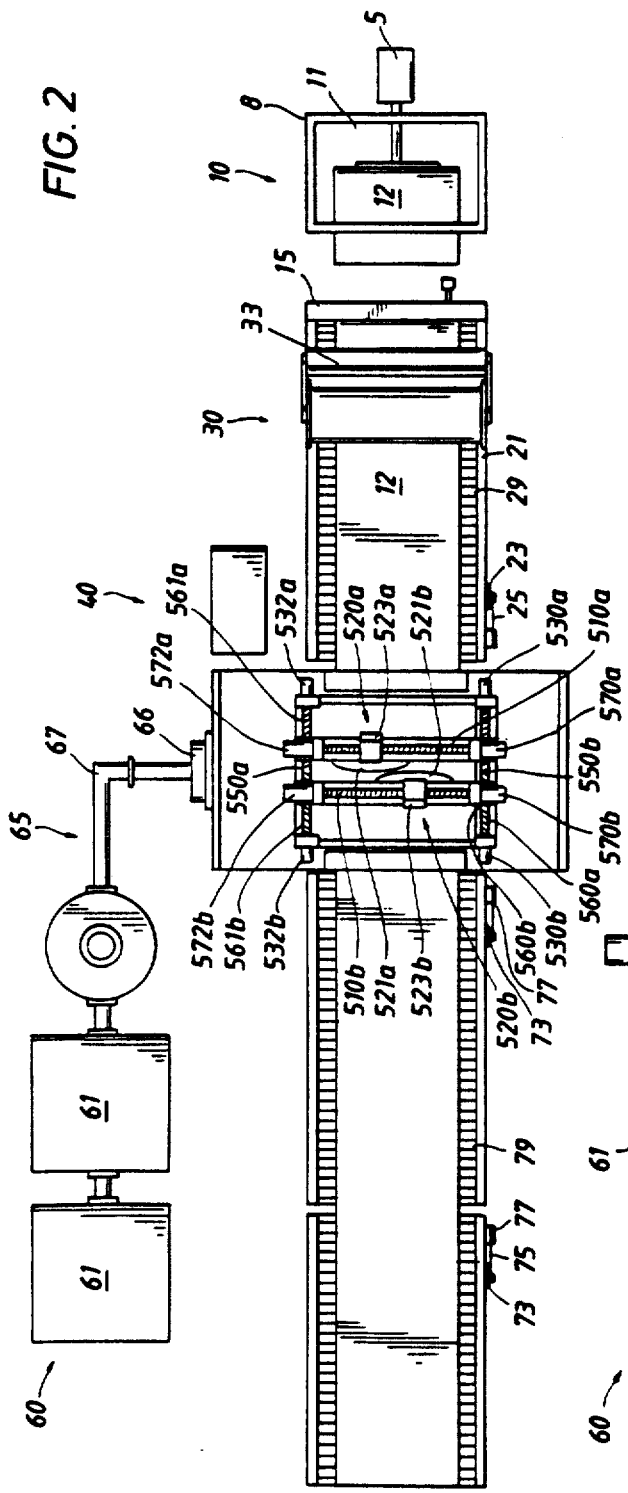
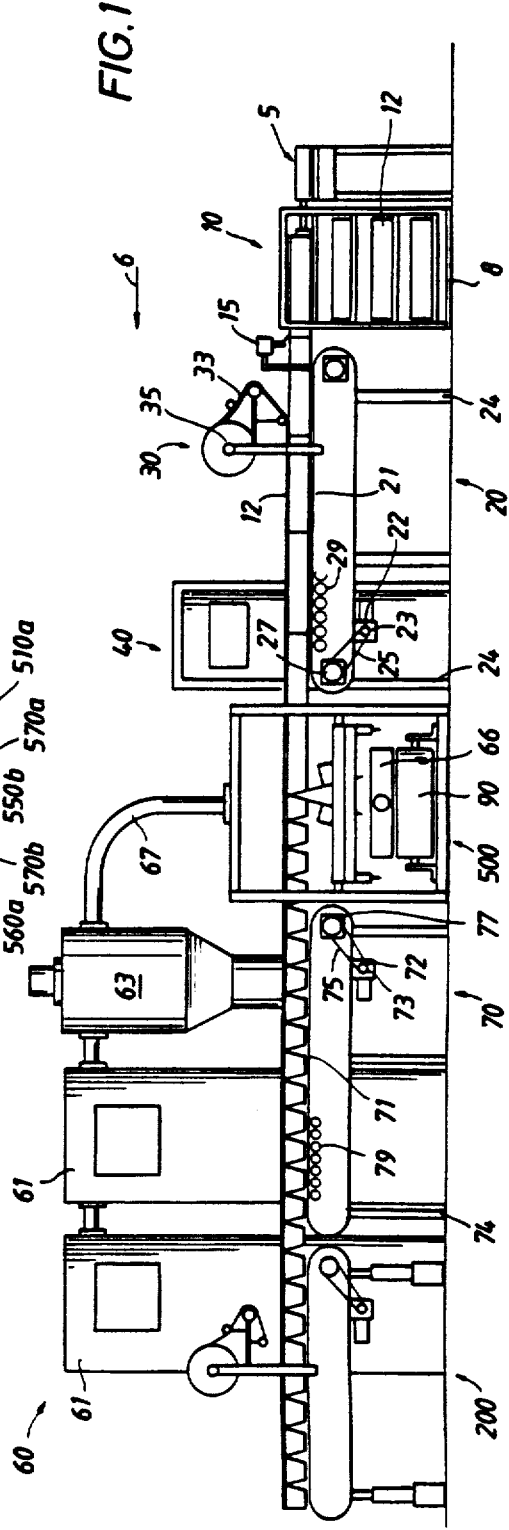
FIG. 2
FIG. 1

APPARATUS AND METHOD FOR MAKING V-GROOVE INSULATION AND TANK WRAP

This is a division of application Ser. No. 07/684,016 filed Apr. 11, 1991 U.S. Pat. No. 5,134,917.

BACKGROUND OF THE INVENTION

1. Field of the Invention

The present invention relates to a method and apparatus for making insulation. In another aspect this invention relates to a method and apparatus for making V-groove insulation. In yet another respect this invention relates to a method and apparatus for making tank pipe wrap.

2. Description of the Related Art

The increasing cost of energy has made it even more imperative that commercial and industrial applications be properly insulated to increase energy efficiency. Such applications include high temperature processes in which insulation is used to prevent energy loss to ambient surroundings. Such applications also include low temperature processes in which insulation is utilized to prevent energy gain to the system from ambient surroundings. Generally, insulation is applied to the exterior of piping, ductwork, tanks, reactors and other areas in which insulation is desired. Although a wide variety of insulation may be applied in a variety of methods, depending upon the desired insulating effect required for a given application, the two most common types of insulation are spray-on insulation and preformed insulation.

Spray-on insulation, is as the name implies, insulation that is sprayed on to the area to be insulated. However, spray-on insulation is recognized to have several disadvantages. Unless care is taken during the application, spray-on insulation may not be evenly applied to the area to be insulated, or if adequately applied, may not evenly adhere or bond to the area being insulated. Improper application, or improper bonding will create "hot" or "cold" spots. Since spray-on insulation hardens, sets-up, or cures after application, such spray-on insulation does not allow for ready access to the insulated member, thus hampering inspection and/or repairs. Spray-on insulation is also known to trap liquids, which if the liquids are salt-bearing or corrosive, may result in the eventual deterioration of the insulation and/or the insulated member. The application of spray-on insulation material is also very sensitive to local environmental conditions. Successful application must generally be performed within rigid wind, temperature and humidity parameters. Another complaint about spray-on insulation is that it is messy in application, and is often considered aesthetically unappealing.

Disadvantages associated with preformed insulation include high cost to individually form or mold a given insulation section to its intended application around the insulated member. For a given length and diameter pipe, duct or tank, a specific dimension insulation section must be formed, and this process is often expensive in terms of time and energy. Preformed insulation sections are also expensive from the standpoint of both shipment and storage, because the items generally have a hollow cavity inside which requires a great deal of space to ship or store, than would, for example, flat boards. Due to the vast array of sizes of pipe, it is generally required that a manufacturer or supplier have many various sizes on hand. Further, preformed sections are not easily adapted to applications other than the shape for which it was made, and often poorly fit even their original intended application due to manufacturing tolerances.

As a result of these and other disadvantages, other contemporary insulation systems have evolved which utilize either V-groove insulation or tank/pipe wrap insulation.

V-groove insulation is a flat section of insulation which has been notched or grooved to accommodate a given diameter circular pipe or duct. FIG. 5(a) shows a pipe 400 partially wrapped with V-groove insulation 440, having a multiplicity of V-grooves 450. V-groove insulation is generally necessary for small diameter pipes and tanks (i.e. less than about 36 inches) because of the extreme bending that the insulation is subjected to. In addition to fitting around cylindrical shapes, V-groove insulation can be made to fit around other shapes such as square, hexagon, octagon, rectangular as well as other shapes.

Tank wrap, known in the industry as lamilla, comprises pliable sheets of insulation that are wrapped around the pipe, tank or other item to be insulated. FIG. 5(b) shows a pipe 400 partially wrapped with tank wrap 410. Tank wrap generally has utility with larger diameter tanks and pipes (i.e. greater than about 36 inches). With smaller diameters, V-grooves are generally required to help the insulation material bend properly.

V-groove insulation and tank wrap is wrapped around a pipe, tank or other item to be insulated and held in place by a fastener such as an appropriately sized band or jacket. When access to the insulated item is required, the band or jacket is released and the V-groove insulation or tank wrap may be easily and quickly removed. Because V-groove insulation and tank wrap are simply boards that are then wrapped around the item to be insulated, they can be stored or shipped with efficient use of storage or shipping space. The boards of V-groove insulation or tank wrap may be easily fabricated to a multiplicity of sizes by merely cutting the board to the proper desired length. Thus, the boards are easily and quickly adapted to other sizes.

However, tank wrap is generally made from fibrous sections such as mineral wool or fiberglass in which the fibers are generally oriented in the lengthwise direction. FIG. 6(a) is a depiction of such sections that have been abutted end-to-end to be used as tank wrap. As shown, tank wrap 410 has fibers 430 generally oriented lengthwise in the tank wrap. However, such tank wrap suffers from a lack of compressive strength and is prone to collapsing radially inward toward the pipe, thus reducing insulating ability of the tank wrap. If the fibers were oriented radially from the pipe, the tank wrap would have greater compressive strength. FIG. 6(b) shows tank wrap 410 having fibers 420 that will be oriented generally radially from the pipe once it is wrapped around a pipe. U.S. Pat. No. 4,838,968 issued Jul. 13, 1989 to Nelson, et al, and U.S. Pat. No. 4,954,202 which is a Continuation-in-Part of U.S. Pat. No. 4,838,968 and which issued Sep. 4, 1990 to Price, et al, both disclose a method and apparatus for making V-groove insulation.

However, neither U.S. Pat. No. 4,838,968 nor U.S. Pat. No. 4,954,202 disclose or suggest an apparatus or method for making tank wrap. Further, the V-groove apparatus of the above patents are limited to cutting isosceles V-grooves, are limited in that they require two saws to make V-grooves, and the carriage below the saw blades, limits the size of blade than can be utilized, thus limiting the thickness of board than can be processed.

Therefore, a need exists for an apparatus and method for making tank wrap, and for making V-groove insulation without the prior art limitations.

SUMMARY OF THE INVENTION

According to one embodiment of this invention there is provided a method of fabricating tank wrap of desired thickness having fibers oriented generally in the thickness direction from lengths of insulation material having fibers oriented generally in the length direction. The method comprises several sequential steps. The first step is positioning the lengths of insulation material lengthwise along a first movable track conveyor, such that the fibers are oriented generally parallel to the direction of conveyance as the lengths progress downstream in a longitudinal direction along the conveyor. Second step is severing the insulation material completely across the length, at intervals equal to the desired thickness of the tank wrap to be fabricated. Next the cut lengths of insulation material are reoriented by positioning them lengthwise across a second movable track conveyor such that the fibers are now oriented generally perpendicular to the direction of conveyance, and in an abutting relationship. Finally, a continuous length of backing material is affixed to the abutted severed lengths to form a continuous length of tank wrap having fibers generally oriented in the thickness direction.

According to another embodiment of the present invention there is provided an apparatus for fabricating tank wrap of desired thickness having fibers oriented generally in the thickness direction from lengths of insulation material having fibers oriented generally in the length direction, said apparatus comprising: a frame; a first conveyor system comprising an endless loop belt disposed along the frame and adapted to travel in a longitudinal direction; a feeding means situated at an upstream end of the conveyor system, and adapted to position the lengths of insulation material lengthwise along the belt, such that the fibers are oriented generally parallel to the direction of travel; a cutting means situated downstream of the feeding means and adapted to completely sever the insulation material across the length, at intervals equal to the desired thickness of the tank wrap to be fabricated; a second conveyor system comprising a second endless belt disposed along the frame and adapted to travel in the longitudinal direction and transport the severed lengths away from the cutting menus, and off of the second conveyor system; a third conveyor system comprising a third conveyor system comprising a third belt disposed along the frame and adapted to travel in the longitudinal direction, which is positioned downstream and below the second conveyor system to catch the severed lengths as they convey off of the second conveyor system; a reorienting means situated at an upstream end of the third conveyor system and adapted to reorient the severed lengths lengthwise across the third belt such that the fibers of the severed lengths are now oriented generally perpendicular to the direction of travel; an abutting means located downstream of the reorienting means and adapted to place the severed lengths in an abutted relationship while maintaining the conveyor system to catch the severed lengths as they convey off of the second conveyor system; and a backing means situated downstream of the abutting means and adapted to affix backing to the abutted severed lengths to form a continuous sheet of tank wrap.

According to yet another embodiment of the present invention there is provided a V-groove cutting apparatus comprising: a base comprising a generally parallel pair of rods; saw mounts comprising a generally parallel pair of rods each independently slidably and rotatably disposed on and oriented generally perpendicular to the base rods; a pair of saws, each slidably mounted on one of the saw mounts; a saw mount movement means for each saw mount affixed to each base rod for slidably moving each saw mount independently along the base; a saw movement means for each saw affixed to each saw mount rod for slidably moving each saw along the saw mount rods; and a saw mount rotation means for each saw mount affixed to the saw mounts for rotating the saw mounts to set the saw cutting angle.

BRIEF DESCRIPTION OF THE DRAWINGS

In order to more fully understand the drawings used in the detailed description of the present invention, a brief description of each drawing is presented.

FIG. 1 shows a side view of the V-grooving apparatus of the present invention.

FIG. 2 is an overhead view of the V-grooving apparatus of the present invention.

DETAILED DESCRIPTION OF THE INVENTION

Figure 3:
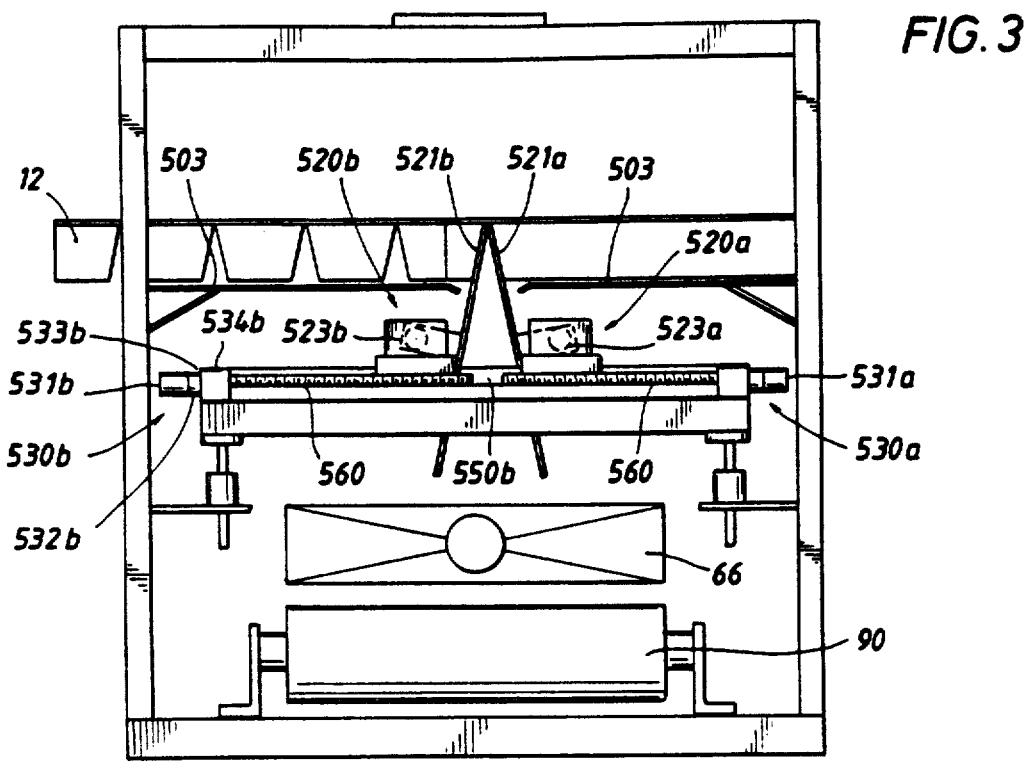
FIG. 3 is a side view of the cutting station of the present invention.

FIG. 1 shows a side view and FIG. 2 shows an overhead view of the apparatus of the present invention in which sections of insulation are transformed into lengths of V-groove insulation.

Referring now to both FIGS. 1 and 2 it can be seen that the apparatus generally comprises a series of stations, each disposed along, above or proximate to a conveyor system. The conveyor system, shown generally as conveyor 20, conveyor 70 and conveyor 200, conveys the insulation sections 12 along a linear path in the direction represented by direction arrow 6, from the feeding station shown generally at 10, to the butt joint adhesive station 15, to the backing station shown generally at 30, to the cutting station shown generally at 500.

Conveyor 20 is designed to convey the insulation sections 12 in a linear path from the feeding station 10 to the cutting station 500. Conveyor 70 is designed to convey the insulation sections 12 in a linear path from the cutting station 500 for further processing downstream. Conveyor 200 is an optional conveyor for further downstream processing. Conveyor 20, conveyor 70 and conveyor 200 are all conventional conveyor systems that utilize a motor driven endless loop disposed on a series of rollers supported by a frame. Conveyor 20 comprises endless loop conveyor belt 21 that is driven by motor 23. Drive belt 25 connects the motor pulley 22 with the conveyor drive pulley 27. The conveyor belt 21 is disposed on a series of rollers 29 (not all shown), and the entire conveyor 20 is supported by a frame, shown by legs 24. In a similar fashion, conveyor 70 comprises endless loop conveyor belt 71 that is driven by motor 73. Drive belt 75 connects the motor pulley 72 with the conveyor drive pulley 77. The conveyor belt 71 is disposed on a series of rollers 79 (not all shown), and the entire conveyor 70 is supported by a frame, shown by legs 74. Conveyor 200 is similar to conveyor 20 and conveyor 70.

The feeding station 10 is generally required to place the insulation sections 12 in an end-to-end abutting relationship on conveyor belt 21 of conveyor 20 where the insulation sections are then joined together with an adhesive in the end-to-end abutted relationship to form a long continuous sheet. Many different feeding systems are available that can accomplish the above task. The feeding system shown in feeding station 10 of the FIGS. 1 and 2 comprises a billet auto loader 5 and a magazine feed 8. The feed magazine 8 is placed in load position 11 and the billet auto loader 5 feeds the insulation sections 12 onto conveyor belt 21. Once all of the insulation sections 12 of feed magazine 8 in load position 11 have been fed onto conveyor belt 21, that feed magazine 8 can be reloaded or replaced with another loaded feed magazine 8 and the feeding may be continued. As the insulation sections 12 are placed onto conveyor belt 21, they are joined together in an end-to-end abutting relationship with an adhesive at butt joint adhesive station 15, an adhesive is applied to at least one of the ends of insulation to be abutted together and the two insulation sections 12 are then pressed together by billet auto loader 5 to form a continuous sheet.

Once the insulation sections 12 are abutted together to form a continuous sheet, they are then conveyed along conveyor 20 to the backing station 30, where backing 33 is applied. Backing may generally be applied by any method. Common methods of applying backing, include the application of self-sticking backing to the insulation section 12, or application of backing after applying an adhesive to either the backing, the insulation section 12, or both. In the embodiment shown, self sticking backing is utilized. The backing is generally applied to insulation sections 12 from a spool 35 that is situated over conveyor 20. The adhesive may be applied by sprayer, or with a contactor such as a brush or roller. The backing is applied over the abutted insulation sections 12 so as to form a continuous integral sheet.

Any suitable backing material that can withstand the rigors of the manufacturing process and the rigors of insulation applications may be utilized. Suitable backing material is generally comprised of a flexible mylar or kevlar composition such as for example Hypolon ® TGH-100 laminate made by Alpha Associates, Inc. of Woodbridge, N.J. or a foil scrim (FSK) or all service jacket (ASJ) manufactured by LAMTEX Corp. of Flanders, N.J.

Ideally, the backing material should be exactly juxtaposed on the insulation sections 12 in order to avoid expensive and time consuming trimming operations. Unfortunately, there are many factors which may effect this exact juxtaposition. For example, inherent irregularities associated with different factory winding processes may effect how the backing is unwound off of the roll. Some backing materials may arrive from the factor staggered or unevenly would on the roll. Due to these and other problems, an alignment apparatus (not shown) is generally required to ensure even distribution and alignment of the backing on the insulation sections 12. Such alignment systems are well known to those of skill in the art, and would include for example, an electric eye guide such as model no. 57044H/H1116 electric eye and control component that is available from Hydralign, Inc.

Once the backing is applied, the insulation sections 12 are then conveyed to the cutting station 500 where the desired cuts are made to the abutted insulation sections 12.

Figure 4:
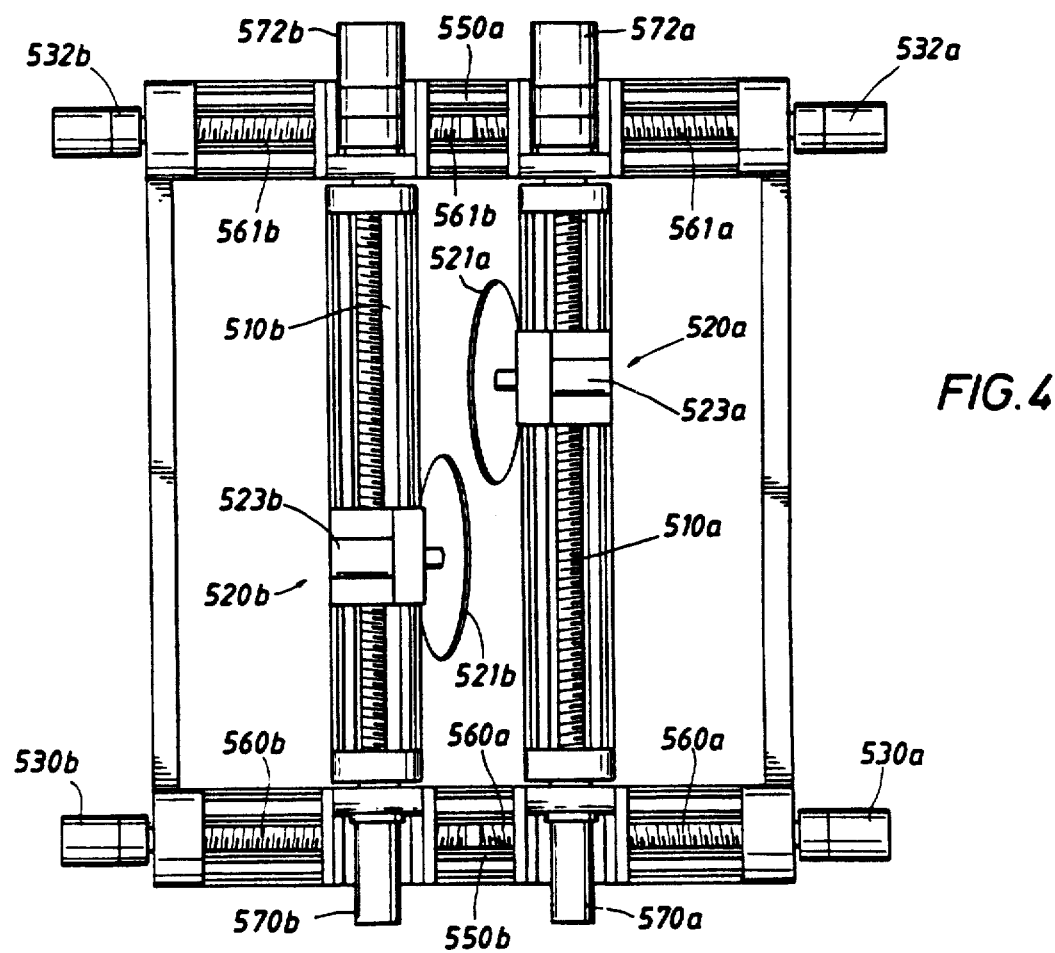
FIG. 4 is an overhead view of the cutting station of the present invention.
Figure 6A:
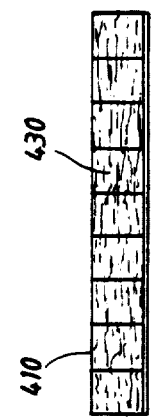
FIG. 6 shows (a) tank wrap with fibers oriented in the lengthwise direction, and (b) tank wrap with fibers oriented in the thickness direction.
Figure 6B:
Figure 5B:
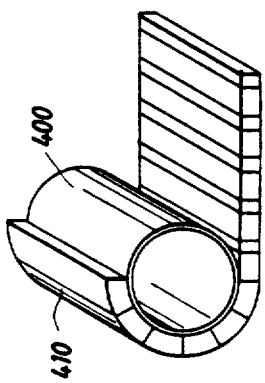
FIG. 5 shows (a) V-groove insulation wrapped around a pipe, and (b) tank wrap wrapped around a pipe.
Figure 5A:
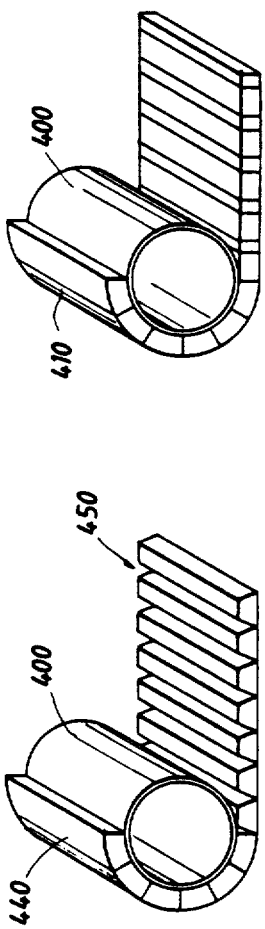

The cutting station 500 is shown in FIGS. 1 and 2 and in more detail in FIGS. 3 and 4 (note that the blade angle varies between FIGS. 3 and 4), and generally comprises a pair of circular saws 520$a$ and 520$b$ which are mounted respectively on saw mounts 510$a$ and 510$b$ which allow the circular saws 520$a$ and 520$b$ to traverse beneath the insulation sections 12 in a direction generally perpendicular to the machine direction. The saw mounts 510$a$ and 510$b$ generally each comprise a precise lead screw and ground cylinder shaft. Saw position motors 570$a$ and 570$b$ move circular saws 520$a$ and 520$b$, along saw mounts 510$a$ and 510$b$, respectively. Each saw position motor 570$a$ and 570$b$ generally comprises a stepper or servo motor and optionally a brake to precisely move the circular saws 520$a$ and 520$b$ along saw mounts 510$a$ and 510$b$. Each saw blade 521$a$ and 521$b$ is powered by a saw motor 523$a$ and 532$b$. Saw motors 523$a$ and 523$b$ are generally electric motors that have a horsepower suitable for the operation. In most insulation cutting applications low horsepowers in the range of about 3 to about 25 horsepower are utilized, with the saws running at low r.p.m. in the range of about 8,000 to 12,000 r.p.m.

The blade cutting angle for blades 521$a$ and 521$b$ are each controlled by angle pivot motors 572$a$ and 572$b$. The angle pivot motors 572$a$ and 572$b$ pivot the saw mounts 510$a$ and 510$b$, along with the circular saws 520$a$ and 520$b$. By rotating saw mounts 510$a$ and 510$b$, the angle pivot motors 572$a$ and 572$b$ can cause the blades 521$a$ and 521$b$ to rotate in a full range of motion, allowing for virtually any angle to be cut. The angle pivot motors 572$a$ and 572$b$ generally comprise a servo or stepper motor, brake assembly and gear reducer.

The saw mounts 510$a$ and 510$b$ are mounted generally perpendicular across a generally parallel pair of mount supports 550$a$ and 550$b$. The mount supports 550$a$ and 550$b$ each generally comprise two precise lead screws and a ground cylindrical shaft. Mount support 550$b$ comprises lead screws 560$a$ and 560$b$, to which one end of saw mounts 510$a$ and 510$b$ is mounted and moves along. The lead screws 560$a$ and 560$b$ are oppositely threaded to allow saw mounts 560$a$ and 560$b$ to move together or apart. The other ends of saw mounts 510$a$ and 510$b$ are likewise connected to lead screws 561$a$ and 561$b$ on mount support 550$a$. Lead screws 561$a$ and 561$b$ are likewise threaded to allow for saw mounts 510$a$ and 510$b$ to move together or apart. Saw mount position motors 530$a$ and 532$a$ both simultaneously move saw mount 510$a$ along mount supports 550$b$ and 550$a$. Saw mount position motors 530$a$ and 532$a$ operate in a master/slave relationship and move saw mount 510$a$ in such a manner so as not to bind it. Saw mount position motors 530$a$ and 532$a$ both comprise a stepper or servo motor and a brake to precisely position the saw mount 510$a$ along mount supports 550$b$ and 550$a$.

In a similar fashion, saw mount position motors 530$b$ and 532$b$ position saw mount 510$b$ along mount supports 550b and 550a. Saw mount position motors 530b and 532b also both comprise stepper or servo motors and a brake to accurately position the saw mount 510b along mount supports 550b and 550a. Saw mount position motors 530b and 532b also operate in a master/slave relationship to prevent binding of saw mount 510b.

Support guides 503 support the insulation 12 as it passes through the cutting station 500.

The apparatus of the present invention is preferably controlled by a computer, represented generally by control cabinet 40. Such a computer would control the conveyor motors 25 and 75, the billet auto loader 5, the backing station 30, all of the motors in cutting station 500, and vacuum system 60, and any other item to allow for automatic running of the apparatus.

In an actual operation for cutting V-grooves in insulation sections 12, the angle pivot motors 572a and 572b are used to set blades 521a and 521b at the proper desired angle. The blades 521a and 521b are positioned apart from each other at the proper distance by using saw mount position motors 530a and 530b and saw mount position motors 532a and 532b.

Since the angles on each cutting blade can be set independently of each other, the V-groove apparatus of the present invention is not limited to cutting an isosceles V-groove. Triangle shapes such as right angle, scalene, and obtuse may be cut. For example, one blade angle may be set at the vertical, while the other blade may be set at the desired angle. The resulting V-groove will not be an isosceles V-groove.

Furthermore, since circular saw 520a and 520b may be rotated through 360°, it is possible for one saw to cut a V-groove without aid of the other saw. This of course allows operation of the machine in the event that one circular saw suffers a mechanical failure. The lack of a carriage underneath allows for larger diameter blades to be substituted for blades 521a and 521b, to allow for cutting of thicker pieces of board.

The apparatus of the present invention may also comprise a planning station (not shown). It is desired that insulation sections 12 each have approximately the same thickness. While it is possible to order insulation sections 12 of a given thickness it is also understood that there is some variation in manufacturing tolerances. Thus it may be necessary to have a planning station appropriately located along the apparatus of the present system. Such a planning system generally comprises a band saw assembly disposed laterally across the conveyor 20, preferably located upstream of the backing station, so as not to remove the backing. The planning system should be adjustable so as to accommodate various thicknesses of insulation sections 12.

The heavy pieces of scrap material created by the sawing operation will drop below to a scrap conveyor 90 which is shown in FIG. 1. The lighter particles such as dust, are removed via an exhaust system shown generally at 60. Exhaust fan 65 has a rubberized blade to help break up the larger particles that are removed through exhaust opening 66 by the exhaust fan 65. A duct 67 transports the exhausted particles to a cyclone 63 which drops larger particles out below and sends the lighter particles to bag houses 61 where they are trapped on bag filters.

Once the insulation sections 12 have been properly cut at cutting station 500 they are then conveyed by conveyor 70 on conveyor belt 71 for further processing.

Figure 7:
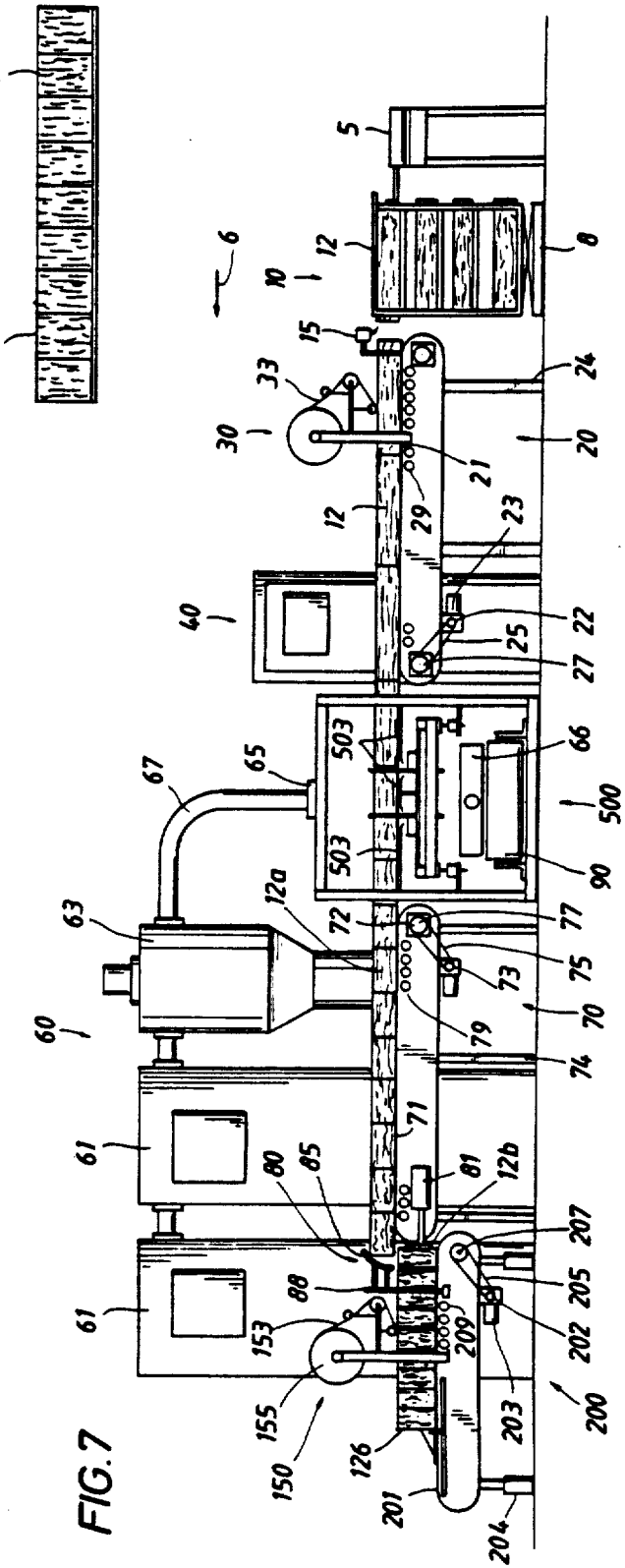
FIG. 7 shows a side view of the tank wrap apparatus of the present invention.

FIG. 7 shows another embodiment of this invention in which tank wrap having fibers generally oriented in the width direction, are manufactured from insulation sheets having fibers generally oriented in the lengthwise direction. With the exception of the backing station 30, this embodiment will utilize the apparatus as above described plus a reorienting station 80, a backing station 1150, and a non-optional conveyor 200.

Reorienting station 80 allows the cut pieces 12a, having fibers oriented generally in the machine direction, to be guided off of conveyor belt 71 of conveyor 70 by reorienting guide 85 and land on conveyor 200 reoriented such that the fibers are now oriented generally perpendicular to the machine direction. The reoriented pieces 12b are then joined together in an end-to-end abutting relationship at butt joint adhesive station 88. To abut pieces 12b together, the conveyor system is stopped, and an engaging means 81 is used to press pieces 12b together so that the adhesive will adhere the pieces 12b together. The engaging means 81 may be any suitable linear actuator. In the embodiment shown, engaging means 81 is a piston. Once reoriented pieces 12b are joined together, the conveyor is restarted and backing 153 is then applied at backing station 150.

Conveyor 200 comprises endless loop conveyor belt 201 that is driven by motor 203. Drive belt 205 connects motor pulley 202 with conveyor drive pulley 207. The conveyor belt 201 is disposed on a series of rollers 209 (not all shown), and the entire conveyor 200 is supported by a frame, shown by legs 204. Conveyor 200 is located immediately downstream from conveyor 70 and is positioned lower than conveyor 70, utilizing adjustable legs 204.

In an actual operation to make tank wrap, cutting station 500 is operated to cut the insulation sections 12 into pieces 12a. This may be accomplished using both saws 520a and 520b with blades 521a and 521b in the vertical position. Alternatively the cutting station 500 could be operated with only one saw 520a or 520b in operation with the respective saw blade in the vertical position while the other saw is rotated out of the way.

The present invention is not limited to cutting any specific type of material, and generally any type of rigid insulation material may be processed. Examples of suitable insulation materials that may be processed by the present invention include those comprised of wood, perlite, fiberglass, mineral wool, and calcium silicate. While the present invention has been illustrated as processing insulation materials, it is not to be so limited. In fact, the present invention could have application in furniture manufacture and other type of manufacturing operations which require complex cutting geometries.

The apparatus of the present invention is also versatile enough to cut shapes other than V-grooves. For example, the blade may be rotated through a material during the cutting process to form a circular or elipital shape.

While prior art machines are generally limited to processing materials of density of no more than about 12 lb/cf, the present invention is not so limited. Higher density material may be cut by controlling the feeding and cutting speeds.

The description given herein is intended to illustrate the preferred embodiments of the present invention. It is possible for one of ordinary skill in the art to make various changes to the details of the present invention, including changes in the size, shape and materials, as well as in the details of the illustrated construction without departing from the spirit of this invention. Therefore, it is intended that all such variations be included within the scope of the present invention as claimed.

I claim:

1. An apparatus for fabricating tank wrap of desired thickness having fibers oriented generally in the thickness direction from lengths of insulation material having fibers oriented generally in the length direction, said apparatus comprising:
   (a) a frame;
   (b) a first conveyor system comprising an endless loop belt disposed along the frame and adapted to travel in a longitudinal direction;
   (c) a means for feeding situated at an upstream end of the conveyor system, and adapted to position the lengths of insulation material lengthwise along the belt, such that the fibers are oriented generally parallel to the direction of travel;
   (d) a means for cutting situated downstream of the feeding means and adapted to completely sever the insulation material across the length, at intervals equal to the desired thickness of the tank wrap to be fabricated wherein the means for cutting comprises;
     (i) a base comprising a generally parallel pair of rods;
     (ii) saw mounts comprising a generally parallel pair of rods each independently slidably and rotatably disposed on and oriented generally perpendicular to the base rods;
     (iii) a pair of saws, each slidably mounted on one of the saw mounts;
     (iv) a saw mount movement means for each saw mount affixed to each base rod for slidably moving each saw mount independently along the base;
     (v) a saw mount means for each saw affixed to each saw mount rod for slidably moving each saw along the saw mount rods; and
     (vi) a saw mount rotation means for each saw mount affixed to the saws mounts for rotating the saw mounts about its axis of symmetry to set the saw cutting angle;
   (e) a second conveyor system comprising a second endless belt disposed along the frame and adapted to travel in the longitudinal direction and transport the severed lengths away from the cutting menus, and off of the second conveyor system;
   (f) a third conveyor system comprising a third conveyor system comprising a third belt disposed along the frame and adapted to travel in the longitudinal direction, which is positioned downstream and below the second conveyor system to catch the severed lengths as they convey off of the second conveyor system;
   (g) a means for reorienting situated at an upstream end of the third conveyor system and adapted to reorient the severed lengths lengthwise across the third belt such that the fibers of the severed lengths are now oriented generally perpendicular to the direction of travel;
   (h) an means for abutting located downstream of the reorienting means and adapted to place the severed lengths in an abutted relationship while maintaining the conveyor system to catch the severed lengths as they convey off of the second conveyor system;
   (i) a means for backing situated downstream of the abutting means and adapted to affix backing to the abutted severed lengths to form a continuous sheet of tank wrap.

2. The apparatus of claim 1 wherein the backing means comprises a backing spool and a contact arm arranged to affix backing from the spool onto the abutted severed lengths.

3. The apparatus of claim 2 wherein the backing means further comprises an adhesive application means to apply adhesive to at least one of the backing or the abutted severed lengths prior to affixing the backing.

4. The apparatus of claim 3 wherein the adhesive application means comprises a spraying means.

5. The apparatus of claim 3 wherein the adhesive application means comprises a roller or brush.

6. An apparatus for fabricating tank wrap of desired thickness having fibers oriented generally in the thickness direction from lengths of insulation material having fibers oriented generally in the length direction, said apparatus comprising:
   (a) a frame;
   (b) a first conveyer system comprising an endless loop belt disposed along the frame and adapted to travel in a longitudinal direction;
   (c) a means for feeding situated at an upstream end of the conveyor system, and adapted to position the lengths of insulation material lengthwise along the belt, such that the fibers are oriented generally parallel to the direction of travel;
   (d) a means for cutting situated downstream of the feeding means and adapted to completely sever the insulation material across the length, at intervals equal to the desired thickness of the tank wrap to be fabricated wherein the cutting means comprises
     (i) a base comprising a generally parallel pair of rods;
     (ii) saw mounts comprising a generally pair of rods each independently slidably and rotatably disposed on and oriented generally perpendicular to the base rods;
     (iii) a pair of saws, each slidably mounted on one of the saw mounts;
     (iv) a saw mount movement means for each saw mount affixed to each base rod for slidably moving each saw mount independently along the base;
     (v) a saw movement means for each saw affixed to each saw mount rod for slidably moving each saw along the saw mount rods; and
     (vi) a saw mount rotation means for each saw mount affixed to the saw mounts for rotating the saw mounts about its axis of symmetry to set the saw cutting angle.
   (e) a second conveyor system comprising a second endless belt disposed along the frame and adapted to travel in the longitudinal direction and transport the severed lengths away from the curing means, and off of the second conveyor system;
   (f) a third conveyor system comprising a third conveyor system comprising a third belt disposed along the frame and adapted to travel in the longitudinal direction, which is positioned downstream and below the second conveyor system to receive the severed lengths as they convey off of the second conveyor system;
   (g) a means for reorienting situated at an upstream end of the third conveyor system and adapted to reorient the severed lengths lengthwise across the third belt such that the fibers of the severed lengths are now oriented generally normal to a plane generally parallel to the direction of travel;

(h) a means for abutting located downstream of the reorienting means and adapted to place the severed lengths in an abutted relationship while maintaining the conveyor system to receive the severed lengths as they convey off of the second conveyor system;

(i) a means for backing situated downstream of the abutting means and adapted to affix backing to the abutted severed lengths to form a continuous sheet of tank wrap.

7. A cutting apparatus comprising:

a base comprising a generally parallel pair of rods;

saw mounts comprising a generally parallel pair of rods each independently slidably and rotatably disposed on and oriented generally perpendicular to the base rods;

a pair of saws, each slidably mounted on one of the saw mounts;

a saw mount movement means for each saw mount affixed to each base rod for slidably moving each saw mount independently along the base;

a saw mount movement means for each saw affixed to each saw mount rod for slidably moving each saw along the saw mount means; and a saw mount rotation means for each saw mount affixed to the saw mounts for rotating the saw mounts to set the saw cutting angle;

wherein the base rods and the saw mount rods each comprise precise lead screws and ground cylinder shafts.

* * * * *